(12) United States Patent
Löffler et al.

(10) Patent No.: US 6,216,077 B1
(45) Date of Patent: Apr. 10, 2001

(54) SYSTEM FOR DETERMINING A CONTROL QUANTITY

(75) Inventors: Jürgen Löffler, Winnenden; Andrea Steiger-Pischke, Weissach; Martin-Peter Bolz, Oberstenfeld; Marko Poljansek, Reutlingen; Wolfgang Hermsen, Rodgau; Holger Hülser, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/283,640

(22) Filed: Apr. 1, 1999

(30) Foreign Application Priority Data

Apr. 1, 1998 (DE) .............................................. 198 14 483

(51) Int. Cl.$^7$ .................................................. F16H 61/02
(52) U.S. Cl. .............................................. 701/58; 701/51
(58) Field of Search ......................................... 701/51, 58

(56) References Cited

U.S. PATENT DOCUMENTS

| | | | |
|---|---|---|---|
| 4,829,434 | * 5/1989 | Karmel et al. | 701/59 |
| 5,157,609 | 10/1992 | Stehle et al. . | |
| 5,251,512 | * 10/1993 | Koenig et al. | 477/120 |
| 5,748,472 | * 5/1998 | Gruhle et al. | 701/51 |
| 5,860,891 | * 1/1999 | Bauerle | 477/48 |
| 6,006,151 | * 12/1999 | Graf | 701/57 |
| 6,012,009 | * 1/2000 | Kronenberg et al. | 701/56 |

FOREIGN PATENT DOCUMENTS

| | | |
|---|---|---|
| 4136613 | 5/1993 | (DE) . |
| 4401416 | 7/1995 | (DE) . |
| 195 24 938 | 1/1997 | (DE) . |
| 195 28 625 | 2/1997 | (DE) . |
| 2285876 | 7/1995 | (GB) . |

OTHER PUBLICATIONS

"Die Adaptive Getriebesteuerung für die Automatikgetriebe der BMW Fahrzeuge mit Zwölfzylindermotor" by A. Welter et al, ATZ Automobiltechnische Zeitschrift 94 (1992), pp. 428 to 438.
"Die Adaptive Getriebesteuerung für BMW–Automobile" by A. Welter et al, ATZ Automobiltechnische Zeitschrift 95 (1993), pp. 420 to 434.

\* cited by examiner

*Primary Examiner*—Michael J. Zanelli
(74) *Attorney, Agent, or Firm*—Walter Ottesen

(57) ABSTRACT

The invention proceeds from a system for considering differing amounts of components for determining at least one control quantity such as for controlling the operation of a motor vehicle. Such a system is known from the state of the art wherein a value is determined as a control quantity for the adaptive transmission control. This value characterizes the type of driver or the driving style. At least two different supply objects (for example, start-up evaluation, gradient evaluation) are provided with the aid of which, for each case, a component for determining the control quantity is determined. The determined components are then supplied to at least one collector which forms the evaluation quantity, for example, by maximum formation, weighted and/or moving-window sum formation of the individually determined components. The essence of the invention is that means are provided with which the supply of the components of the supply objects is controlled to the collector. With the system of the invention, it is possible in a simple manner to adapt the number of components, which are to be considered for the formation of the evaluation quantity, to the particular situation.

7 Claims, 4 Drawing Sheets

SYSTEM FOR DETERMINING A CONTROL QUANTITY

FIELD OF THE INVENTION

The invention relates to a system for considering different amounts of components for determining at least one control quantity.

BACKGROUND OF THE INVENTION

Such systems are, for example, known in adaptive transmission controls. Adaptive transmission controls are, for example, known from U.S. Pat. No. 5,157,609 and German patent publication 4,136,613 as well as the article of Welter et al in the publication "AT, Automobiltechnische Zeitschrift" 94 (1992) 9, starting at page 428 and the article of Welter et al in the publication "AT, Automobiltechnische Zeitschrift" 95 (1993) 9, starting at page 420.

In automatic transmissions, the gear ratio changes are determined, in general, in dependence upon the vehicle longitudinal speed and the engine load (throttle flap angle). This takes place utilizing a characteristic field. In adaptive transmission systems, the characteristic field (with which the transmission ratio changes are determined) can be adapted to the behavior of the driver (driver type), to the traffic situation and/or to the driving situation to which the vehicle is subjected. When assessing the behavior of the driver, it is generally evaluated as to whether the driver is interested more in a driving power orientated driving style or in a driving style optimized for consumption. With the evaluation of the traffic or driving situation, one can, for example, differentiate whether the vehicle is in city traffic, forward of or in a curve, traveling uphill or is in overrun operation. The particular characteristic line is selected in dependence upon the evaluation of the above-mentioned points from a number of different characteristic lines. Furthermore, a shift of the basic shift characteristic field can be provided.

In the state of the art, it is suggested to arrive from different algorithms (for example, startup evaluation, gradient evaluation) at different types of assessment of the particular driver type present. These assessments are collected and then processed to an instantaneously valid type of driver, for example, by maximum formation, weighted sum formation and/or moving-window sum formation. The above-mentioned different types of assessments can be prioritized differently in this processing.

SUMMARY OF THE INVENTION

It is an object of the invention to provide a system for considering different amounts of components to determine at least one control quantity which can be adapted as simply as possible and without great complexity to different requirements.

The system of the invention is for considering different amounts of components (setcomponent$_i$) for forming at least one control quantity (Bg) such as for controlling the operation of a motor vehicle. The system includes: at least two different supply objects (LO$_i$) for forming respective components (setcomponent$_i$) for determining a control quantity (Bg); at least one collector (Sa) to which the components (setcomponent$_i$) are supplied and the collector (Sa) functioning to form the control quantity (Bg) in dependence upon the supplied components (setcomponent$_i$); and, caller/administrator means (Ar, Vw) for controlling the feeding of the components (setcomponent$_i$) of the supply objects (Lo$_i$) to the collector (Sa).

The invention proceeds from a system for considering different amounts of components for determining at least one control quantity such as for steering the operation of a motor vehicle. Such a system is known from the state of the art mentioned above. In this prior art, a value is determined as the control quantity for adaptive transmission control. This value characterizes the type of driver or the driving style. Here, at least two different supply objects are provided such as startup evaluation, gradient evaluation. With these supply objects, a component is determined in each case for determining the control quantity. The determined components are then supplied to at least one collector which forms the evaluation quantity, for example, by maximum formation, weighted sum formation and/or moving-window sum formation of the individually determined components.

The essence of the invention is that means are provided by means of which the supply of the components of the supply objects to the collector is controlled. With the system of the invention, it is possible, in a simple manner, to adapt the number of components to the particular situation. These amounts are to be considered in the formation of the evaluation quantity.

In an advantageous embodiment of the invention, the caller/administrator means are so configured that the determination of the components is started by driving the individual supply objects and/or that the components, which are determined by the supply objects, are supplied to the collector.

Furthermore, it is provided that the caller/administrator means contains data as to whether individual supply objects are active or can be activated. The caller/administrator means can then be subdivided into a caller part and an administrator part. The administrator part contains data as to whether individual supply objects are active or can be activated.

If the caller/administrator means are subdivided into a caller part and an administrator part, then, as a reaction to driving the individual supply objects by the caller part, an enable must take place via the administrator part to supply the components of the individual supply objects to the collector.

A further advantageous configuration of the invention proceeds again from a subdivision of the caller/administrator means into a caller part and an administrator part. Here, it is provided that the caller part initializes the collector by means of an initialization signal and/or the caller part calls up the result, which is formed in the collector, and applies this result to form the control quantity. The formation of the control quantity can take place as follows: via a mean value formation, via a maximum formation and/or by a weighted and/or moving-window sum formation of the determined components.

In an especially advantageous embodiment, the system is used in the context of an adaptive transmission control in a motor vehicle. In this system, means are provided as the supply objects (Lo$_i$) which determine the components (setcomponent$_i$) in different ways, the components (setcomponent$_i$) representing the instantaneous type and/or driving style of the driver of the motor vehicle; the control quantity (Bg), which is formed in the collector (Sa), represents the instantaneous type and/or style of the driver of the motor vehicle; and, function elements of the transmission are driven in dependence upon the formed control quantity (Bg).

BRIEF DESCRIPTION OF THE DRAWINGS

The invention will now be described with reference to the drawings wherein.

DESCRIPTION OF THE PREFERRED EMBODIMENTS OF THE INVENTION

As noted above, the invention relates to a system for considering the different amounts of components for determining control quantities in electronic control apparatus. This system can be applied in several different variations which are explained in the following with respect to FIGS. 1 to 4.

The components, which are to be considered, namely, "setcomponent$_i$" (i=1–3 in these embodiments) are supplied by various supply objects Lo$_i$. The system is characterized in that the number of components, which are to be considered, is freely applicable. The system applies to every type of determination and consideration of these components. A variation of this system is shown in greater detail in FIG. 4 and makes possible an especially simple treatment of different program variations which differ as to the components to be considered.

The essence of the invention is the subdivision of the determination of determination quantities into different amounts of supply objects Lo$_i$ and one collector object Sa which considers their components "setcomponent$_i$" in accordance with internal conditions.

Figure 3:
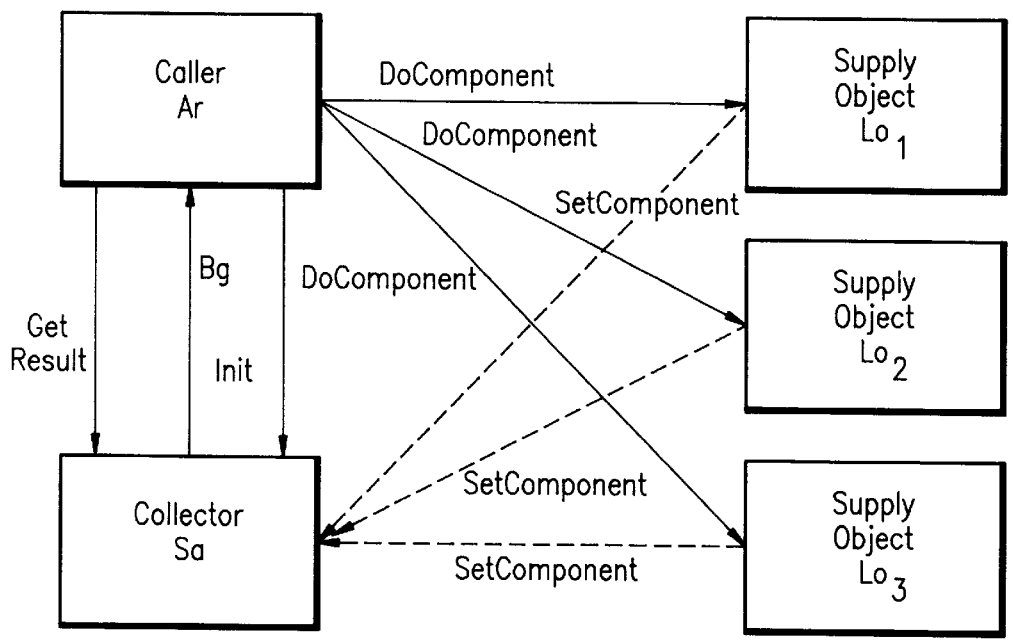
Figure 4:
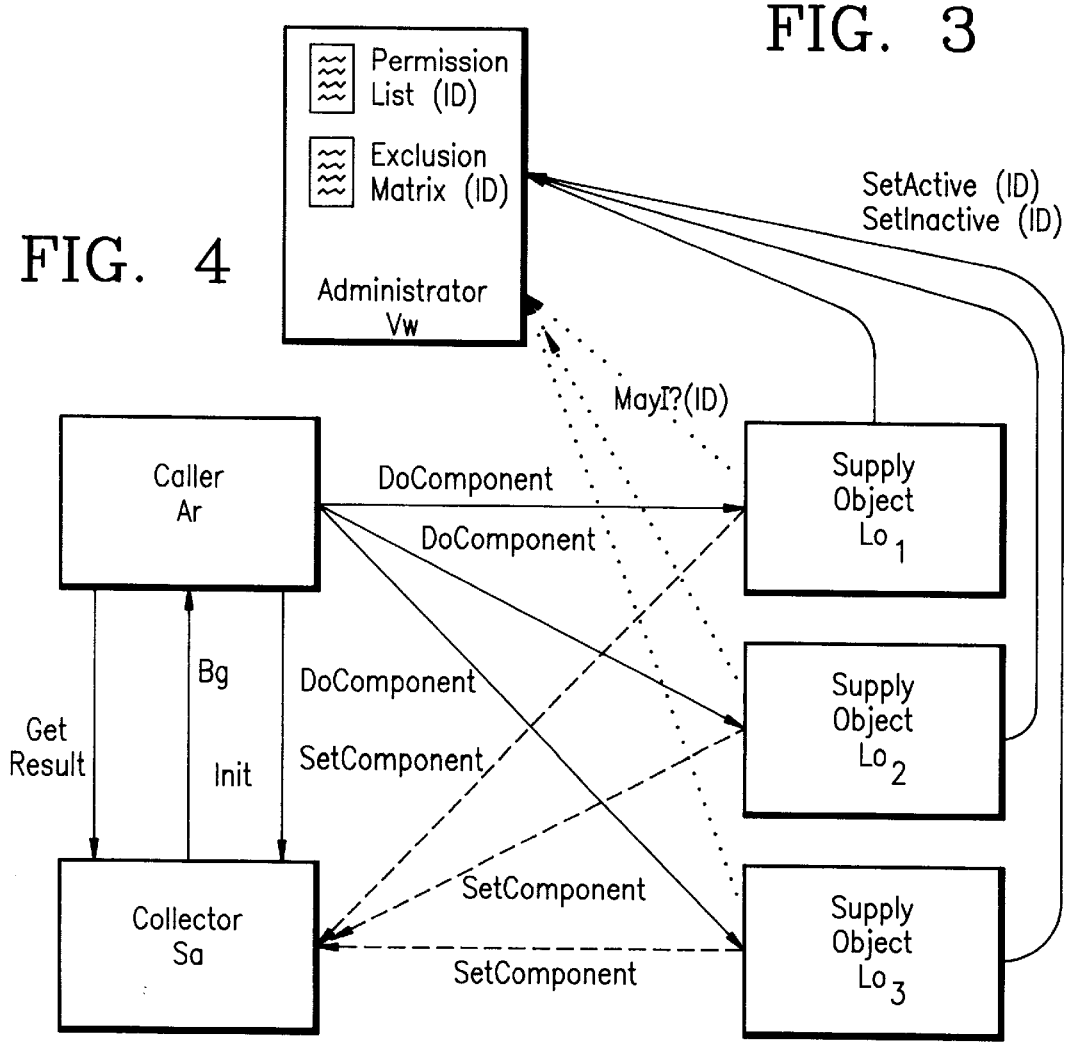

Two still further objects (caller object Ar and administrator Vw) can participate additionally in the variations of the system of the invention shown in FIGS. 3 and 4. The variations presented below differ in the manner as to how the time-dependent synchronization between the components and the internal logic for considering the components are configured. Furthermore, they differ from each other by the nature of the server-client relationship between the participating objects. The invention also relates to all variations which result from combinations of the individual distinctions.

There are essentially three different features in which the variations of the method of the invention can distinguish from each other.

Figure 1:
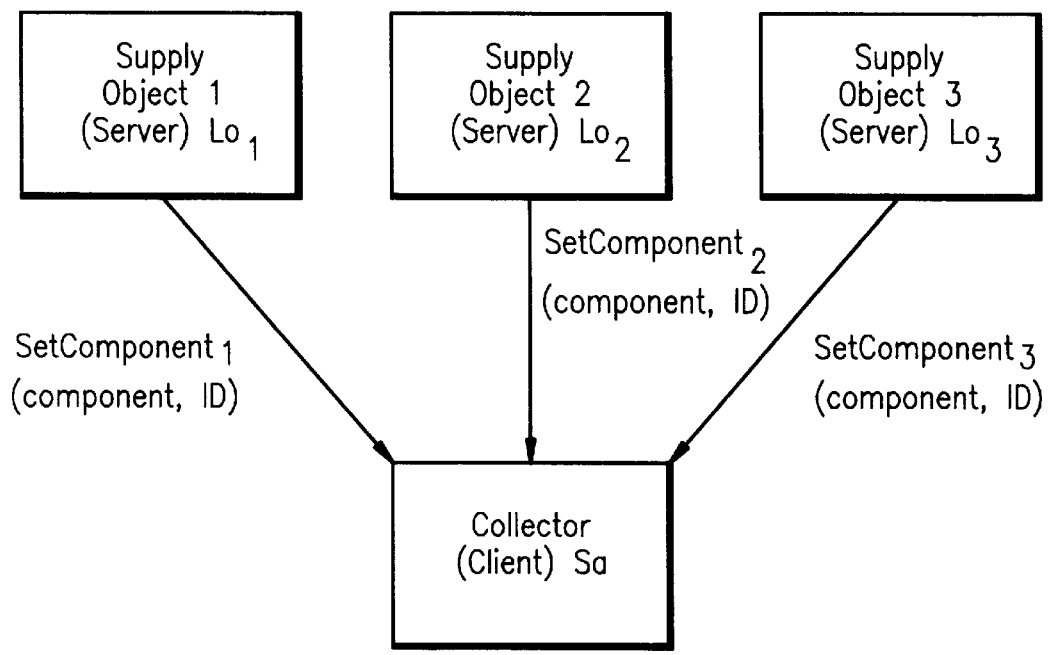
FIGS. 1, 2, 3 and 4 show respective embodiments of the system of the invention for considering different amounts of components for determining a control quantity in an electronic control system.

One distinguishing feature relates to the nature as to how the components "setcomponent$_i$" of the supply objects Lo$_i$ reach the collector object Sa. Basically, the supply objects Lo$_i$ can actively set their component "setcomponent$_i$" or the collector object Sa can request the components at the supply objects. The collector object Sa requires no data as to the number and characteristics of the individual supply object in the case, which is shown in FIG. 1, where the supply objects Lo$_i$ actively set their component. In this case, the supply objects are the server and the collector object is client.

Figure 2:
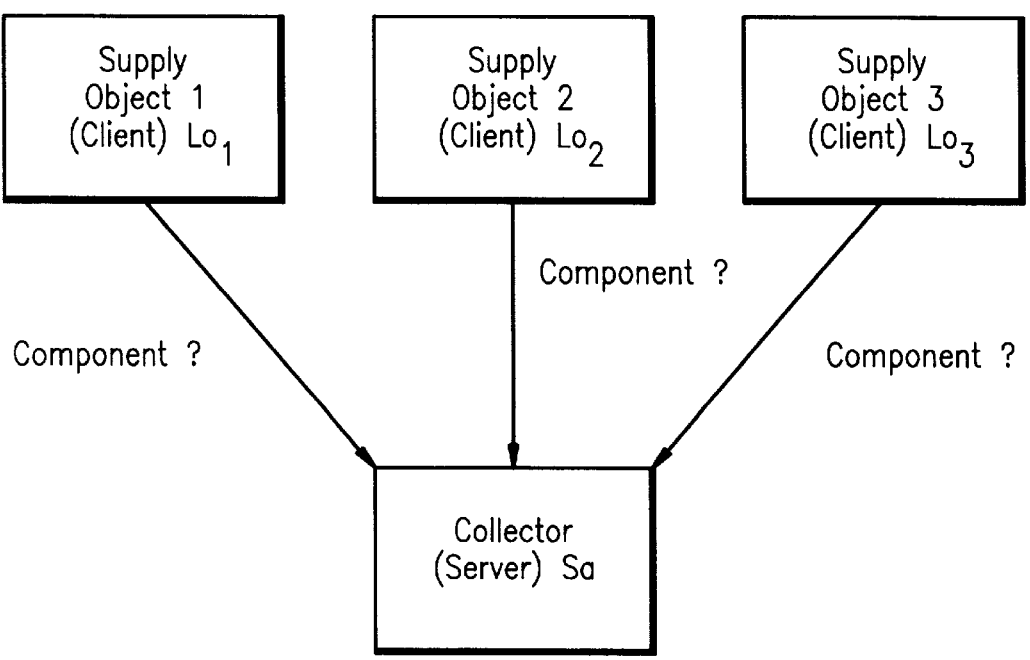

As can be seen in FIG. 2, if the collector object Sa requests the components at the supply objects Lo$_i$, the data as to the number and characteristic of the individual supply objects Lo$_i$ must be made available to the collector object Sa. The collector object now is server and the supply objects are clients.

A second distinguishing feature relates to the control of the activity of the collector and supply objects. There are two possibilities for control. First, there is an internal activity control. Here, the supply objects or the collector object themselves know when they should become active. In the second embodiment shown in FIG. 3, the activity control takes place by an external caller which defines its own object (caller object Ar).

The third distinguishing feature relates to the placement of the administration of the logic under which conditions which supply object should supply its component. The data therefor can lie either at the individual supply objects Lo$_i$, the collector object Sa, the caller object Ar, or, as shown in FIG. 4, at an additional administrator object Vw.

In the following, the different embodiments with their differing features will be explained in greater detail.

As already mentioned, FIG. 1 shows a system wherein the supply objects Lo$_i$ actively supply their component "setcomponent$_i$" to the collector object Sa. To evaluate these components, in addition, an identifier ID must be transmitted to the collector object as to from which supply object Lo$_i$ the transmitted component "setcomponent$_i$" originates. In this variation, the collector object Sa needs no data as to which supply object can provide a component.

FIG. 2 shows a realization in which the collector object Sa requests the components at the supply objects Lo$_i$. Here, no identifier of the components is necessary but the collector object Sa must have data as to the number and characteristics of the supply objects.

FIG. 3 shows the control of the activity by an additional caller object Ar. The caller Ar requests the individual supply objects Lo$_i$ to determine their component "setcomponent$_i$". As in the variation shown in FIG. 1, the supply objects Lo$_i$ supply their component "setcomponent$_i$" after the request to the collector object Sa. The caller Ar initializes, if required, the collector Sa and requests (signal GetResult) the result Bg which the collector Sa has determined from the components "setcomponent$_i$" of the supply objects Lo$_i$. Here, it makes no difference in which way the collector Sa processes the components "setcomponent$_i$" of the supply objects Lo$_i$.

In the variation shown in FIG. 3, the data as to the number and characteristic of the supply objects Lo$_i$ are at the caller Ar. The caller decides especially as to the sequence and the frequency with which the supply objects Lo$_i$ should form and set their component "setcomponent$_i$".

The embodiment shown on FIG. 4 is based on a variation of FIG. 3; however, there is, additionally, an administrator object Vw, which can grant or withdraw the permission (answer to inquiry "MayI? (ID)") to the individual supply objects Lo$_i$ to form a component "setcomponent$_i$" and to transmit the same to the collector Sa.

This administrator Vw can, at first, administer the (static) data as to which supply objects Lo$_i$ can, if at all, become active. For this purpose, the administrator Vw can, for example, contain a list (permission list (ID)) in which it is noted for each identifier (ID) of a supply object Lo$_i$ as to whether this supply object Lo$_i$ may at all become active. In this way, program variations having different supply objects Lo$_i$ can be applied especially easily.

Furthermore, the administrator Vw can also control the mutual exclusion in the event that different supply objects Lo$_i$ should not be active simultaneously. In this case, each supply object Lo$_i$ must transmit its activity state (SetActive (ID), SetInactive (ID)) to the administrator Vw. For this purpose, the supply object must also transmit its identifier to the administrator. Furthermore, the administrator can contain for this purpose a matrix (ExclusionMatrix (ID)) wherein, for each identifier ID of a supply object Lo$_i$, it can be freely entered in dependence upon the activity or non-activity of which other supply object $Lo_i$ the supply object $Lo_i$ can become active. With this list, program variations with different mutual exclusion criteria of the supply objects $Lo_i$ can be applied in an especially simple manner.

If a supply object $Lo_i$ now asks the administrator Vw for permission (MayI? (ID)) while presenting its identifier if it can form and transmit its component "setcomponent$_i$", then the administrator Vw evaluates the application status and the exclusion criteria (ExclusionList (ID)) for this supply object $Lo_i$ and grants or denies this permission in accordance therewith. For this purpose, the administrator must also receive data as to all supply objects $Lo_i$.

Figure 5:
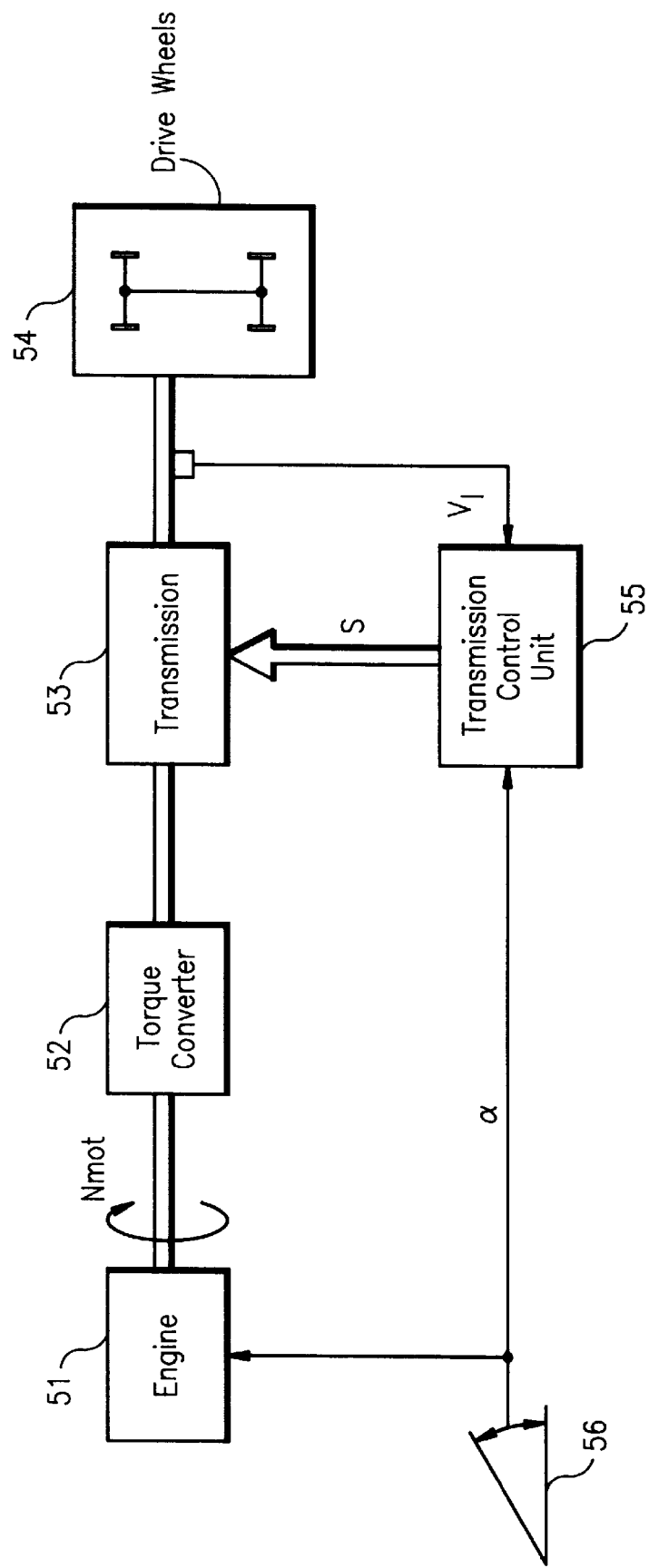
FIG. 5 is a block diagram showing the application of the invention for a transmission control in the context of a drive train of a motor vehicle; and, FIG. 6 is a sequence diagram showing the specific time-dependent sequence for the embodiment of the system of the invention shown in FIG. 4.
Figure 6:
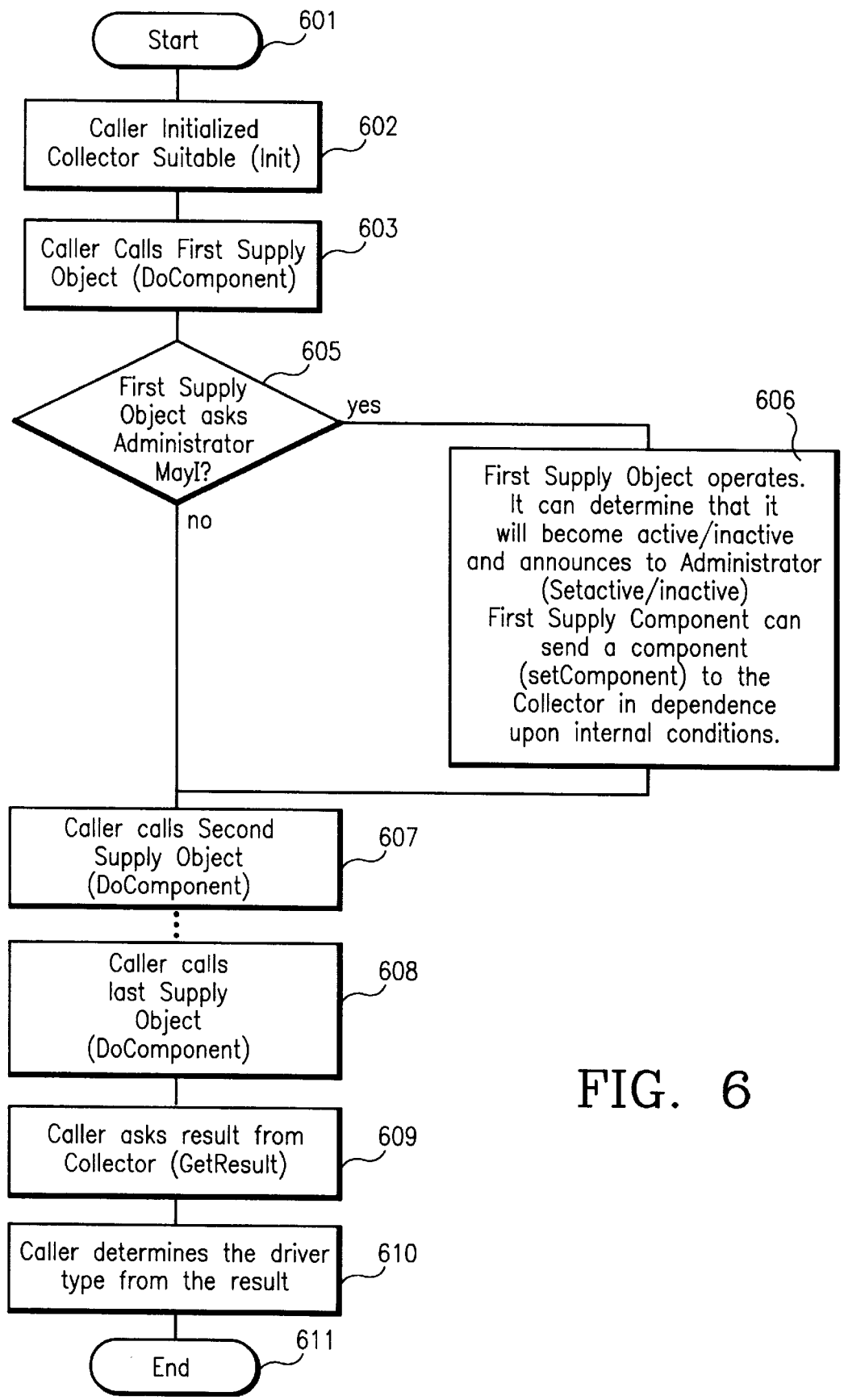

The variation shown in FIG. 4 will now be illustrated with respect to FIGS. 5 and 6 for the determination of the driver type in an adaptive control of a stepped automatic transmission in the motor vehicle.

For the above purpose, FIG. 5 schematically shows the drive train of the motor vehicle. The vehicle engine 51 having the engine rpm Nmot is connected via a clutch or a torque converter 52 and via the transmission 53 to the drive wheels 54 of the vehicle. The driver of the vehicle actuates the accelerator pedal 56 and sets an accelerator pedal angle α. With the position α of the accelerator pedal 56, the power and/or the torque of the vehicle engine 51 is controlled. Furthermore, the position α of the accelerator pedal 56 is supplied to the transmission control unit 55. The transmission control unit 55 then determines essentially a transmission gear which is adjusted at the transmission 53 with the aid of the signal S. The transmission gear is determined by the transmission control unit 55 essentially in dependence upon the vehicle longitudinal speed $V_1$ and the position α.

The task in an adaptive transmission control comprises determining a type of driver from the driver actions on the accelerator pedal 56, which is actuated by the driver, and/or the brake pedal (not shown). The type of driver has an influence on the transmission gear selection S. Specifically, the driver is indexed by the actions of the driver on a scale between "economical" and "sporty". For an economical driver, a high gear would preferably be set; whereas, for a sporty driver, a low transmission gear with correspondingly higher engine rpm Nmot would be selected.

To solve this task, several supply objects $Lo_i$ are introduced which each for themselves register and evaluate a part of the driver actions. Thus, there is, for example, an object "start-up evaluation" which checks with which accelerator position α the driver exceeds a specific low speed threshold (for example $V_1$=20 km/h) coming from below (from lower speeds). If this value is passed through with a high accelerator pedal position α, then the type of driver should be sporty, otherwise, economical. A further one of these supply objects $Lo_i$ (the gradient evaluation) evaluates the gradient (d/dt α) of the accelerator pedal position α. High positive gradients indicate sporty whereas low gradients indicate economical. Additionally, there can, for example, be still a further supply object (driving operation evaluation) which detects a trip having almost constant accelerator pedal position α and makes the driver type in this case economical.

Each of the supply objects $Lo_i$ determines a component "setcomponent$_i$" for the driver type detection from the observed and evaluated driving actions and transmits these components to the object collector Sa. This component "setcomponent$_i$" can have very different forms. Thus, each supply object can, for itself, determine a driver type or the component comprises a value for a counter. This value can be added to the actual count of the counter or the counter can be set to this value or the counter forms the maximum of all values sent to it. In each case, in a further step, the components "setcomponent$_i$", which are collected by the collector Sa, must be converted into a driver type (the control quantity Bg).

In a special variation, for example, the supply object "start-up evaluation" can transmit to the collector Sa a component "setcomponent$_i$" which initializes the collector Sa and leads directly to a specific type of driver; whereas, the remaining supply objects transmit a small positive or negative component to the collector Sa and change the type of driver to be determined slowly in correspondence with the driver action. The collector Sa is then requested at a suitable time point to output its collected components in order to convert them into a driver type Bg.

In addition to the collector in different variations (for example as a counter), the mentioned supply objects and many others are known from the literature such as from the article published in "ATZ" mentioned initially herein.

The system described in FIG. 4 is with respect to an adaptive transmission control. In this system, the activity of the supply objects $Lo_i$ is to be administered and coordinated. Furthermore, the components "setcomponent$_i$" should be suitably processed. For this purpose, the following cases are considered:

(a) Not all supply objects $Lo_i$ are applied in a specific version of a motor vehicle. For example, a general driver type detection can also contain an evaluation of the drive through a curve; whereas, in the specific variation, no suitable sensor means is present for this purpose. In this case, this supply object $Lo_i$ should be switched off by a simple application at the end of the assembly band (end of the production of the vehicle and/or of the transmission control apparatus 55).

(b) The activity of some supply objects $Lo_i$ excludes the activity of other supply objects. For example, the activity of the driving operation evaluation can be suppressed, for example, for an active start-up evaluation.

(c) If the supply object $Lo_i$ transmits an additive or a subtractive component to the collector Sa, then it must be ensured that these components are transmitted with the proper frequency.

To consider the first two cases, the variation of the invention according to FIG. 4 contains the object administrator Vw which has already been described. This administrator Vw administers the static data (MayI? (ID)), which supply object $Lo_i$ is applied in the present embodiment, as well as dynamic data (answer to the question MayI? (ID)) as to which object $Lo_i$ just then may become active. It is advantageous when the administrator Vw includes a matrix (ExclusionMatrix (ID)) which indicates for each supply object $Lo_i$ from which other supply objects they can be blocked. Likewise, it is advantageous when the administrator Vw identifies each supply object via a clear identifier ID.

The sequence, which is shown in FIG. 6, shows the specific time-dependent sequence for the variation shown in FIG. 4.

After the starting step 601, the caller Ar first initializes the collector Sa in a suitable manner (step 602). This initialization is especially then to be applied when the collector Sa operates as a maximum former as described, that is, when each supply object $Lo_i$ supplies a component "setcomponent$_i$" corresponding to a type of driver and the collector Sa then forms the maximum with respect thereto. In this case, it is especially advantageous to initialize (signal Init) the collector Sa at the end of each cycle after the determination of the driver type or, as shown in FIG. 6, at the start of each determination cycle. If the collector Sa is operated as a counter as described, that is, each supply object $Lo_i$ supplies a small additive or subtractive component, then such an initialization is not necessarily required. However, the limits for the value of the counter can be reset with an initialization.

If now in step 603, a supply object $Lo_i$ is requested (signal Docomponent) to supply its component, then it asks at the above-mentioned administrator Vw (while giving its identifier ID) as to whether it even is permitted to become active (step 604, inquiry "MayI?" (ID)). For this purpose, the administrator Vw evaluates the already-mentioned static application data as well as the dynamic data as to exclusions.

If the inquiry at the administrator supplies the result that the object $Lo_i$ may not become active, then it sends data to the administrator Vw that it is inactive. This data is considered by the administrator Vw for the dynamic exclusions. In this case, there is a transition directly to the step 607 (call-up of the second supply object) in the sequence, which is shown in FIG. 6, after the branch 605.

If, in contrast, the inquiry in step 604 supplies the result that the questioned supply object $Lo_i$ is permitted to become active, then the supply object commences its work and transmits data in accordance with internal conditions as to its activity to the administrator Vw (step 606). In this way, for example, the start-up evaluation, when dropping below a speed threshold, can announce "activity" to the administrator Vw; whereas, when this threshold is exceeded, it can announce "inactivity". Here it is not important whether the supply objects announce their activity or inactivity for each call-up or only under specific conditions.

To ensure the above-mentioned third case, all supply objects $Lo_i$ must be called up in a fixed time-dependent sequence (steps 607 and 608). This is ensured by the caller Ar which calls up all supply objects $Lo_i$ in the correct sequence and frequency.

It is advantageous when all supply objects are ordered in a determining cycle within which they are called up precisely one time. It is likewise advantageous when this determining cycle is called up in a fixed time raster (for example, every thirty ms). Likewise, it is advantageous when, at the end of each such determining cycle, the actual collector result Bg or the actual counter count of the collector is read out (signal GetResult, step 609). From this result, the caller then determines in step 610 a type of driver as a control quantity Bg.

The sequence shown in FIG. 6 is again run through after the last step 611.

The internal sequence of the individual supply objects is not shown in greater detail here because it is very specific for the particular supply object. It is especially dependent upon the particular supply object as to whether and when announcements are transmitted to the object administrator and collector.

It is understood that the foregoing description is that of the preferred embodiments of the invention and that various changes and modifications may be made thereto without departing from the spirit and scope of the invention as defined in the appended claims.

What is claimed is:

1. A system for considering different amounts of components (setcomponent$_i$) for forming at least one control quantity (Bg) of a motor vehicle for controlling the operation of the motor vehicle, the system comprising:

at least two different supply objects ($LO_i$) for forming respective components (setcomponent$_i$) for determining a control quantity (Bg);

at least one collector (Sa) to which said components (setcomponent$_i$) are supplied and said collector (Sa) functioning to form said control quantity (Bg) in dependence upon the supplied components (setcomponent$_i$);

caller/administrator means (Ar, Vw) for controlling the feeding of said components (setcomponent$_i$) of said supply objects ($Lo_i$) to said collector (Sa);

said caller/administrator means (Ar, Vw) are partitioned into a caller part (Ar) and an administrator part (Vw);

an enable command (MayI$_i$-yes/no) by said administrator part (Vw) must take place in response to commands (DoComponent$_i$) to the individual supply objects ($Lo_i$) by said caller part (Ar); and, said enable command (MayI$_i$-yes/no) causing to supply said components (setcomponent$_i$) of said individual supply objects ($Lo_i$) to said collector (Sa).

2. The system of claim 1, said caller/administrator means (Ar, Vw) being configured to function to do at least one of the following via commands to the individual ones of said supply objects ($Lo_i$):

(a) starting the determination of said components (setcomponent$_i$); and, (b) sending said components (setcomponent$_i$) determined by said supply objects ($Lo_i$) to said collector (Sa); and, said commands including the following: DoComponent$_i$, MayI?$_i$-yes/no.

3. The system of claim 1, wherein said caller/administrator means (Ar, Vw) are so configured that they hold data as to whether individual ones of said supply objects ($Lo_i$) are active or can be activated; and, wherein said data includes permission lists and an exclusion matrix.

4. The system of claim 1, wherein said caller/administrator means (Ar, Vw) are partitioned into a caller part (Ar) and an administrator part (Vw); and, said administrator part (Vw) holds data as to whether individual supply objects ($Lo_i$) are active or can be activated; and, wherein said data includes a permission list and an exclusion matrix.

5. The system of claim 1, wherein said caller/administrator means (Ar, Vw) are partitioned into a caller part (Ar) and an administrator part (Vw); and, at least one of the following occurs: said caller part (Ar) initializes said collector (Sa) with an initialization signal (Init) and said caller part (Ar) calls up the result (GetResult), which is formed in said collector (Sa), and applies said result (GetResult) to form said control quantity (Bg).

6. The system of claim 1, wherein the formation of said control quantity (Bg) takes place in said collector (Sa) via at least one of the following: a mean value formation, a maximum formation, a weighted sum formation and a moving-window sum formation of the determined components (setcomponent$_i$).

7. The system of claim 1, wherein said system is used in the context of an adaptive transmission control in a motor vehicle, wherein:

means are provided as said supply objects ($Lo_i$) which determine said components (setcomponent$_i$), said components (setcomponent$_i$) representing at least one of the following: the instantaneous type and driving style of the driver of the motor vehicle;

said control quantity (Bg), which is formed in said collector (Sa), represents at least one of the following: the instantaneous type and style of the driver of the motor vehicle; and, function elements of said transmission are driven in dependence upon the formed control quantity (Bg).

* * * * *